(12) United States Patent
Fujiura et al.

(10) Patent No.: US 10,992,174 B2
(45) Date of Patent: Apr. 27, 2021

(54) MONITORING CONTROL SYSTEM

(71) Applicants: Toshiba Energy Systems & Solutions Corporation, Kawasaki (JP); Tokyo Electric Power Company Holdings, Incorporated, Chiyoda-ku (JP)

(72) Inventors: Hiroaki Fujiura, Minato-ku (JP); Masami Onishi, Minato-ku (JP); Hirofumi Fujii, Minato-ku (JP); Hiroaki Sato, Minato-ku (JP); Koichi Takeuchi, Chiyoda-ku (JP); Junya Yamamoto, Chiyoda-ku (JP); Takashi Eguchi, Chiyoda-ku (JP); Tomohiro Kubo, Chiyoda-ku (JP); Masanori Endo, Chiyoda-ku (JP); Kenji Kitami, Chiyoda-ku (JP); Takaaki Hosaka, Chiyoda-ku (JP); Jun Inoue, Chiyoda-ku (JP)

(73) Assignees: Toshiba Energy Systems & Solutions Corporation, Kawasaki (JP); Tokyo Electric Power Company Holdings, Incorporated, Chiyoda-ku (JP)

( * ) Notice: Subject to any disclaimer, the term of this patent is extended or adjusted under 35 U.S.C. 154(b) by 17 days.

(21) Appl. No.: 16/608,600

(22) PCT Filed: Apr. 23, 2018

(86) PCT No.: PCT/JP2018/016430
§ 371 (c)(1),
(2) Date: Oct. 25, 2019

(87) PCT Pub. No.: WO2018/199012
PCT Pub. Date: Nov. 1, 2018

(65) Prior Publication Data
US 2021/0075253 A1   Mar. 11, 2021

(30) Foreign Application Priority Data

Apr. 26, 2017 (JP) .............................. JP2017-087104

(51) Int. Cl.
*H02J 13/00* (2006.01)

(52) U.S. Cl.
CPC .. *H02J 13/00002* (2020.01); *H02J 13/00006* (2020.01); *H02J 13/00034* (2020.01)

(58) Field of Classification Search
None
See application file for complete search history.

(56) References Cited

U.S. PATENT DOCUMENTS

2008/0313006 A1* 12/2008 Witter ................ G06Q 30/0601
705/7.17
2010/0152910 A1*  6/2010 Taft ........................ G01D 4/002
700/286
(Continued)

FOREIGN PATENT DOCUMENTS

CN     110363422 A  * 10/2019
JP     7-163052 A     6/1995
(Continued)

OTHER PUBLICATIONS

Fan et al., "The Evolution of Distribution," IEEE, 2009, 6pg. (Year: 2009).*

(Continued)

*Primary Examiner* — Ryan D. Coyer
(74) *Attorney, Agent, or Firm* — Oblon, McClelland, Maier & Neustadt, L.L.P.

(57) ABSTRACT

A monitoring control system including: at least one transmission monitoring control subsystem that performs monitoring control of a power transmission system; at least one distribution monitoring control subsystem that performs monitoring control of a power distribution system; a calcu-
(Continued)

lation server that stores outage plan names related to outages of the power transmission system and outages of the power distribution system; and a network that connects the transmission monitoring control subsystem, the distribution monitoring control subsystem, and the calculation server. The monitoring control system performs monitoring control of the power transmission system and the power distribution system based on the outage plan name.

12 Claims, 14 Drawing Sheets

(56) References Cited

U.S. PATENT DOCUMENTS

| | | | |
|---|---|---|---|
| 2011/0029142 A1 | 2/2011 | Sun et al. | |
| 2012/0072039 A1* | 3/2012 | Anderson | G06Q 10/06315 700/291 |
| 2012/0130767 A1 | 5/2012 | McMullin | |
| 2012/0203388 A1* | 8/2012 | DiLuciano | G06Q 10/04 700/292 |
| 2012/0266209 A1* | 10/2012 | Gooding | H04L 63/20 726/1 |
| 2015/0234410 A1* | 8/2015 | Aganagic | G05B 15/02 700/291 |
| 2017/0052231 A1* | 2/2017 | Park | G01R 31/40 |
| 2018/0218584 A1* | 8/2018 | Grove | H04L 51/04 |

FOREIGN PATENT DOCUMENTS

| | | |
|---|---|---|
| JP | 2012-110220 A | 6/2012 |
| JP | 2017-34750 A | 2/2017 |

OTHER PUBLICATIONS

Kumar et al., "Outage Management System for Power Distribution Network," IEEE, 2014, 8pg. (Year: 2014).*
Sinha et al., "Smart Grid Initiative for Power Distribution Utility in India," IEEE, 2011, 8pg. (Year: 2011).*
Japanese Office Action dated Jan. 14, 2020 in Japanese Patent Application No. 2019-514483 (with English translation), 4 pages.
Indian Office Action dated Jun. 19, 2020 in Patent Application No. 201917047842, 6 pages.
International Search Report dated May 15, 2018, in PCT/JP2018/016430, 3 pages (with English translation).
Written Opinion of the International Searching Authority dated May 15, 2018, in PCT/JP2018/016430, 10 pages (with English translation).
Written Opinion of the International Preliminary Examining Authority dated Jul. 2, 2019, in PCT/JP2018/016430, 10 pages (with English translation).
Bangladesh Examination Report dated Jul. 9, 2019, in Patent Application No. P/BD/2018/123, 1 page.
International Preliminary Report on Patentability Chapter II dated Oct. 1, 2019, in PCT/JP2018/016430, 7 pages (with English translation).

* cited by examiner

FIG. 5

| PLAN NO. | OUTAGE PLAN NAME | OUTAGE PLAN INFORMATION ||
| --- | --- | --- | --- |
| | | OPERATION CENTER | FACILITY NAME |
| 1 | NO. 1 TRANSFORMER STOP PLAN | REGION A | SUBSTATION A TRANSFORMER NO. 1 |
| 2 | BUS OUTAGE PLAN | REGION A | SUBSTATION A BUS NO. 1 |
| 3 | DISTRIBUTION LINE SECTION NO. 1 OUTAGE PLAN | REGION A | DISTRIBUTION LINE NO. 1 SECTION NO. 1 |
| ⋮ | ⋮ | ⋮ | ⋮ |

FIG. 6

| OPERATION NO. | OPERATION NAME | PLAN NO. | OPERATION PROCEDURE |
|---|---|---|---|
| 1 | OPERATION NAME A | 1 | SH |
| 2 | OPERATION NAME C | 3 | TH |
| ⋮ | ⋮ | ⋮ | ⋮ |

MONITORING CONTROL SYSTEM

TECHNICAL FIELD

The present invention relates to a monitoring control system.

BACKGROUND ART

Electric power systems that supply electric power from a power generation plant to consumer loads are classified into power transmission systems and power distribution systems. A power transmission system transmits electric power generated at a power generation plant to a transmission substation via a primary transmission line and transmits the electric power that has been stepped down at the transmission substation to a distribution substation via a secondary transmission line. A power distribution system supplies the electric power that has been stepped down at the distribution substation to consumer loads via distribution lines. There has been known a monitoring control system that performs monitoring control of the electric power system as above described. The monitoring control system includes a transmission monitoring control system that performs monitoring control of the power transmission system, a distribution monitoring control system that performs monitoring control of the power distribution system, and a facility state monitoring system that monitors the states of facility devices and supports maintenance duties.

In the electric power system, work such as expansion and maintenance/inspection of facilities is performed in some cases. In this case, in order to eliminate or minimize power outage to consumer loads, work such as system switching in the power transmission system, section switching in the power distribution system is performed. Prior to execution of such work, an outage plan is first created, and then a procedure schedule that defines individual operations for facilities or devices is created on the basis of the outage plan (for example, refer to Patent Literature 1 below).

CITATION LIST

Patent Literature

[Patent Literature 1] Japanese Unexamined Patent Application Publication No. H7-163052

SUMMARY OF INVENTION

Technical Problem

In creation of a procedure schedule such as one mentioned above, various systems such as an outage plan formulation system, a transmission monitoring control system, a distribution monitoring control system are used separately, and currently, data coordination between the systems is inefficient. The present invention has been made in view of the above circumstances, and an object of the present invention is to provide a monitoring control system capable of improving efficiency of data coordination between systems.

Solution to Problem

A monitoring control system of the present invention comprises: at least one transmission monitoring control subsystem that performs monitoring control of a power transmission system; at least one distribution monitoring control subsystem that performs monitoring control of a power distribution system; a calculation server that stores outage plan names related to outages of the power transmission system and outages of the power distribution system; and a network that connects the transmission monitoring control subsystem, the distribution monitoring control subsystem, and the calculation server. The monitoring control system performs monitoring control of the power transmission system and the power distribution system on the basis of the outage plan name.

Moreover, in the present invention, the transmission monitoring control subsystem and the distribution monitoring control subsystem may respectively be provided with an outage plan name registration unit that transmits an outage plan to the calculation server, and the outage plan name registration unit may convert the outage plan name into a common data format usable in each of the transmission monitoring control subsystem and the distribution monitoring control subsystem.

Further, in the present invention, the transmission monitoring control subsystem and the distribution monitoring control subsystem may respectively be provided with an operation unit that creates an operation procedure on the basis of the outage plan name, and the operation unit of one subsystem of the transmission monitoring control subsystem and the distribution monitoring control subsystem may create the operation procedure on the basis of a system state where the other subsystem executes the operation procedure. In this case, the operation unit may be provided with an operation name management unit that receives a switchability determination request on whether or not the outage plan is executable, and the operation name management unit may create a scheduled system on the basis of the outage plan name and may transmit a switchability determination response on the basis of the scheduled system.

Advantageous Effects of Invention

According to the present invention, since the transmission monitoring control subsystem, the distribution monitoring control subsystem, and the calculation server are connected via the network, data coordination between the systems can be made more efficient.

BRIEF DESCRIPTION OF THE DRAWINGS

FIG. 5 is a conceptual diagram showing outage plan names.

FIG. 6 is a conceptual diagram showing operation names.

DESCRIPTION OF EMBODIMENTS

Figure 1:
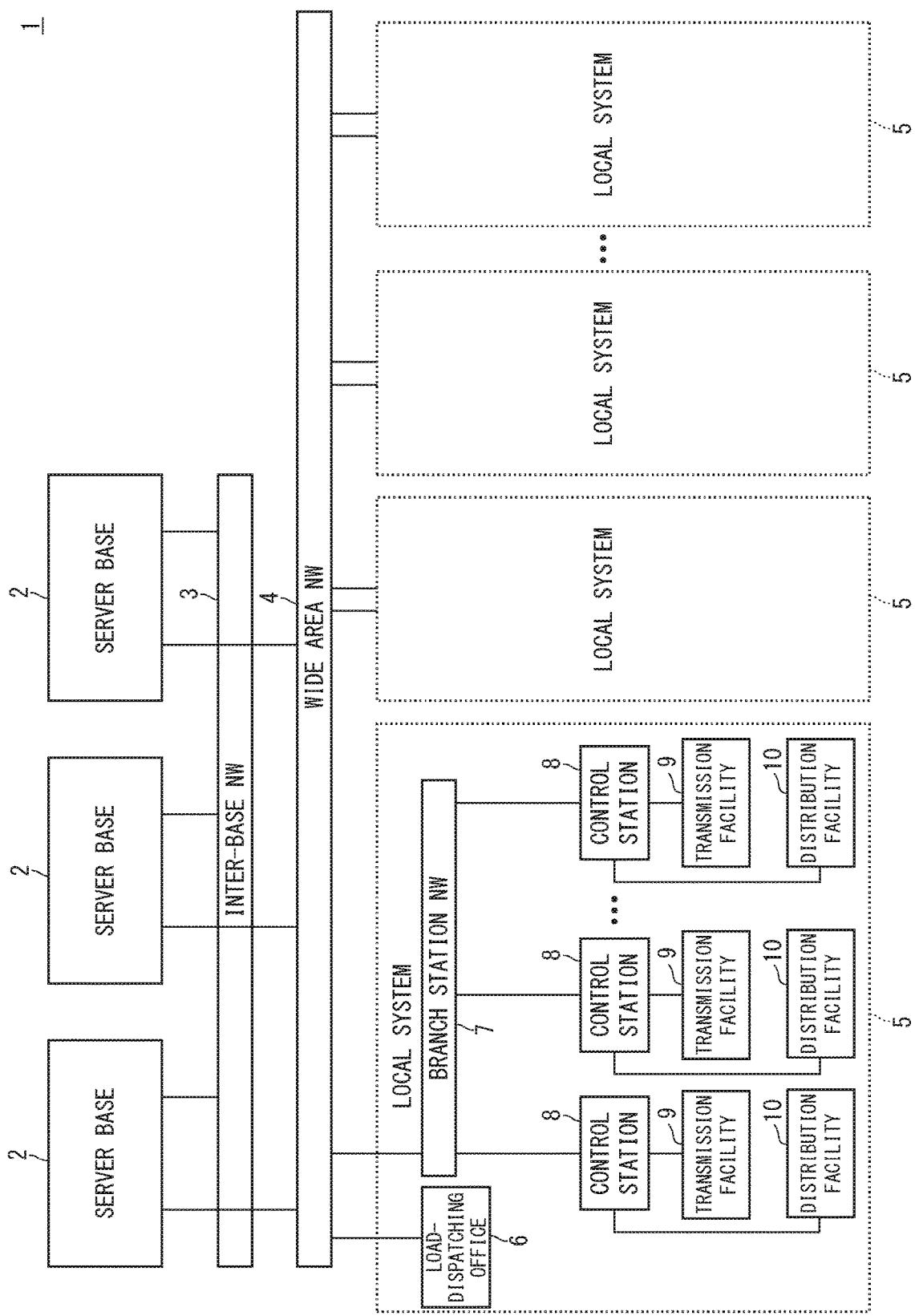
FIG. 1 is a diagram showing an electric power system to which a monitoring control system according to an embodiment is applied.

Hereinafter, an embodiment will be described with reference to the drawings. FIG. 1 is a diagram showing an electric power system to which a monitoring control system according to the embodiment is applied. In the present embodiment, suitably, "network" is abbreviated as "NW", "firewall" is abbreviated as "FW", and "database" is abbreviated as "DB". An electric power system 1 shown in FIG. 1 is provided with a plurality of server bases 2, an inter-base NW 3, a wide area NW 4, and a plurality of local systems 5. A monitoring control system 14 according to the embodiment (shown later in FIG. 2 and so forth) is provided at the server base 2.

Each of the plurality of server bases 2 has a function of a monitoring control system. The plurality of server bases 2 are installed in a geographically distanced and distributed manner in preparation for natural disasters such as earthquakes. The plurality of server bases 2 are communicably connected to each other via the inter-base NW 3 and provide mutual backup to each other. Moreover, in the case where the load at one server base 2 is high, the load can be distributed to the plurality of server bases 2. The number of the server bases 2 is set arbitrarily in consideration of redundancy and the number of the server bases 2 need not be three.

The local systems 5 are communicably connected to the server base 2 via the wide area NW 4. Each local system 5 is a system provided for each area control such as for the Chiba area, the Kanagawa area, and the Saitama area (administrative area). The local system 5 includes a load-dispatching office 6, a branch station NW 7, and a plurality of control stations 8. The load-dispatching office 6 (load-dispatch office) is connected to the wide area NW 4 and is communicably connected to the server base 2 via the wide area NW 4. The branch station NW 7 is connected to the wide area NW 4, and the plurality of control stations 8 are each connected communicably to the server base 2 via the branch station NW 7 and the wide area NW 4. The plurality of control stations 8 are provided for each regional area control.

Each of the plurality of control stations 8 is communicably connected to a transmission facility 9 within each regional area control. The transmission facility 9 includes, for example, devices provided in a transmission substation, and devices provided on a transmission line or on a transmission tower. Moreover, each of the plurality of control stations 8 is communicably connected to a distribution facility 10 within each regional area control. The distribution facility 10 includes, for example, devices provided in a distribution substation (for example, a line switch and a circuit breaker) and devices provided on a distribution line or on a utility pole (for example, a zone switch and a smart meter).

The inter-base NW 3 is multiplexed so as to enable continuous running with use of another NW in a case where one NW fails. The wide area NW 4 and the branch station NW 7 are also multiplexed in a manner similar to that of the inter-base NW 3. Moreover, the communication line between the wide area NW 4 and the load-dispatching office 6 is provided in a plurality of routes, so that in a case where a failure occurs in one communication line route (for example, a wired communication line), communication can still be continued by means of another communication line route (for example, a wireless communication line). Furthermore, each of the communication line between the branch station NW 7 and the control station 8, the communication line between the control station 8 and the transmission facility 9, and the communication line between the control station 8 and the distribution facility 10 is also provided in a plurality of routes as with the communication line between the wide area NW 4 and the load-dispatching office 6.

Figure 2:
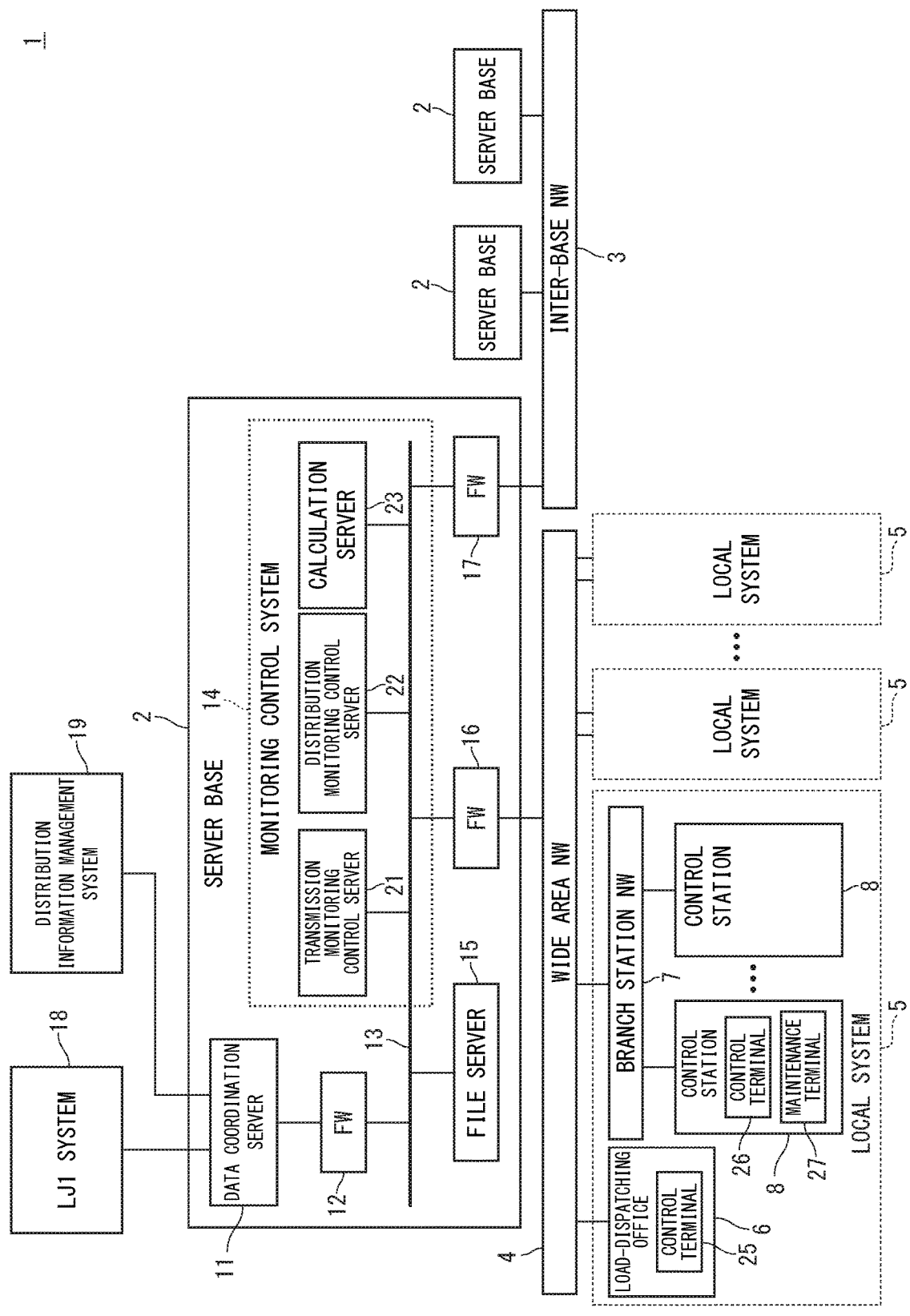
FIG. 2 is a diagram showing the monitoring control system according to the embodiment.

FIG. 2 is a diagram showing the monitoring control system according to the embodiment. The server base 2 is provided with a data coordination server 11, a FW 12, a data bus 13, a monitoring control system 14, a file server 15, a FW 16, and a FW 17.

The data coordination server 11 is communicably connected to a system outside the server base 2 (hereunder, referred to as external system) via a business-based NW. The data coordination server 11 performs data coordination with the external system via the business-based NW. For example, the data coordination server 11 is provided only at one server base 2 among the plurality of server bases 2. For example, a plurality of physical computers (physical hardware devices) are provided at one server base 2, and the data coordination server 11 is multiplexed with the plurality of physical computers.

The data coordination server 11 is connected as an external system to each of an LJ1 system 18 (work stop adjustment system) and a distribution information management system 19. The LJ1 system 18 supplies outage plan information related to an outage plan of the power transmission system (transmission monitoring control outage plan information) to the data coordination server 11. The distribution information management system 19 supplies outage plan information related to an outage plan of the power distribution system (distribution monitoring control outage plan information) to the data coordination server 11. The data coordination server 11 is connected to the data bus 13. In the following description, when the transmission monitoring control outage plan information and the distribution monitoring control outage plan information are treated in a similar manner, these pieces of information are appropriately referred to as outage plan information.

The monitoring control system 14 performs monitoring control of the power transmission system and the power distribution system on the basis of the outage plan name. The application configuration of the monitoring control system 14 is divided into subsystems for respective purposes of duties. The monitoring control system 14 includes a transmission monitoring control subsystem, a distribution monitoring control subsystem, and a substation facility maintenance subsystem. Each of the subsystems described above is realized by applications that are provided by the following servers provided in the monitoring control system 14.

The monitoring control system. 14 includes a transmission monitoring control server 21, a distribution monitoring control server 22, and a calculation server 23. The transmission monitoring control server 14, the distribution monitoring control server 22, and the calculation server 23 are respectively connected to the data bus 13. The data bus 13 is connected to the wide area NW 4 via the FW 16. Moreover, the data bus 13 is connected to the inter-base NW 3 via the FW 17.

The transmission monitoring control subsystem is realized by an application that is provided by the transmission monitoring control server 21 and performs monitoring and control of the power transmission system. The transmission monitoring control subsystem is divided functionally and logically for each control range (area control). A single load-dispatching office 6 is provided within each area control, and a control terminal 25 is provided in the load-dispatching office 6. The control terminal 25 is, for example, a control console or the like. The control terminal 25 is communicably connected to the transmission monitoring control server 21 via the wide area NW 4. The control terminal 25 functions as the transmission monitoring control subsystem by means of an application provided by the transmission monitoring control server 21.

The distribution monitoring control subsystem is realized by an application that is provided by the distribution monitoring control server 22 and performs monitoring and control of the power distribution system control as well as maintenance of a control target facility in the power distribution system. The distribution monitoring control subsystem is divided functionally and logically for each control range (regional area control).

The regional area control belongs to any one of area controls and does not overlap in multiple area controls. A single load-dispatching office 8 is provided in each regional area control, and a control terminal 26 is provided in the control station 8. The control terminal 26 is, for example, a control console or the like. The control terminal 26 is communicably connected to the distribution monitoring control server 22 via the branch station NW 7 and the wide area NW 4. The control terminal 26 functions as the distribution monitoring control subsystem by means of an application provided by the distribution monitoring control server 22.

The substation facility maintenance subsystem performs maintenance of facilities managed by the transmission monitoring control subsystem. The substation facility maintenance subsystem is realized by an application that is provided by the transmission monitoring control server 21. The substation facility maintenance subsystem performs monitoring control of facilities within a monitoring control range of the transmission monitoring control subsystem. The substation facility maintenance subsystem is a system in which some functions of the transmission monitoring control subsystem are limited. As with the transmission monitoring control subsystem, the substation facility maintenance subsystem is capable of performing a facility stop operation. However, it differs from the transmission monitoring control subsystem in being incapable of performing a system change operation.

In the control station 8 there is provided a maintenance terminal 27. The maintenance terminal 27 is, for example, a maintenance console or the like. The maintenance terminal 27 is communicably connected to the transmission monitoring control server 21 and the distribution monitoring control server 22 respectively via the branch station NW 7 and the wide area NW 4. The maintenance terminal 27 functions as the substation facility maintenance subsystem by means of an application provided by the transmission monitoring control server 21.

As described above, the monitoring control system 14 is of a configuration in which the respective servers are consolidated at the server base 2, and has a low dependency on an organization, a place, and so forth to which each load-dispatching office 6 or each control station 8 belongs. Access to each server from the load-dispatching office 6 and/or the control station 8, etc., is performed by accessing (screen display, device operation) from a thin client or the like.

The transmission monitoring control server 21 is a main server of the transmission monitoring control subsystem and the substation facility maintenance subsystem. The transmission monitoring control server 21 performs monitoring control of various states and collects information. The transmission monitoring control server 21 utilizes a physical computer installed at each server base 2. At the server base 2 there is provided a physical computer that operates as the transmission monitoring control server 21. For example, the server base 2 is provided at three locations, and there are provided a total of three transmission monitoring control servers 21, one for each server base 2. These three transmission monitoring control servers 21 synchronize with each other while one of them is in a constant operation state and the other two are in a standby operation state, thereby ensuring redundancy.

Moreover, in the physical computer that operates as the transmission monitoring control server 21 there is included a logical computer for each area control. The logical computer is a virtual machine that operates on a physical computer, and a plurality of guest operating systems (logical computers) can be implemented on a host operating system of the physical computer. A plurality of logical computers is implemented according to the number of area controls, and the plurality of logical computers can be executed on the physical computer operating as the transmission monitoring control server 21. As a result, leveling of calculation load in the physical computers becomes possible.

The distribution monitoring control server 22 is a main server of the distribution monitoring control subsystem. The distribution monitoring control server 22 performs monitoring control of various states and collects information. The distribution monitoring control server 22 utilizes a physical computer installed at each server base 2. At the server base 2 there is provided the physical computer that operates as the distribution monitoring control server 22. For example, the server base 2 is provided at three locations, and there are provided a total of three distribution monitoring control servers 22, one for each server base 2. These three distribution monitoring control servers 22 synchronize with each other while one of them is in a constant operation state and the other two are in a standby operation state, thereby ensuring redundancy.

Moreover, in the physical computer that operates as the distribution monitoring control server 22 there is included a logical computer for each regional area control. A plurality of logical computers are implemented according to the number of regional area controls, and the plurality of logical computers can be executed on the physical computer operating as the distribution monitoring control server 22. As a result, leveling of calculation load in the physical computers becomes possible.

The calculation server 23 stores outage plan names related to outages of the power transmission system and outages of the power distribution system. The calculation server 23 performs name management of the outage plan names. The calculation server 23 saves the outage plan names. The calculation server 23 utilizes the physical computer installed at each server base 2. Furthermore, the file server 15 is provided at the server base 2. The file server 15 is, for example, a data warehouse. The file server 15 saves the outage plan names and operation names for a prolonged period of time.

Figure 3:
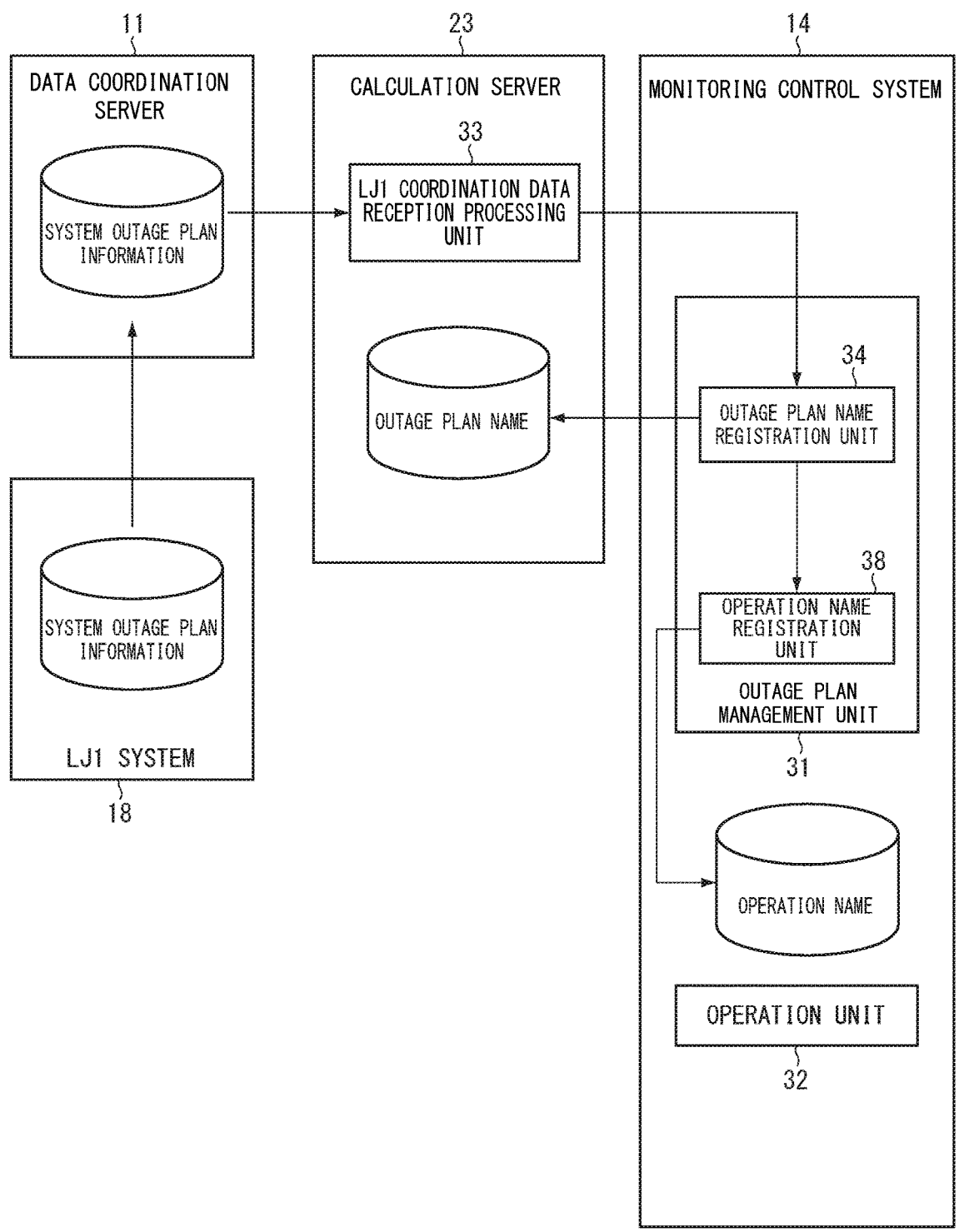
FIG. 3 is a block diagram showing an LJ1 system, a data coordination server, and the monitoring control system.

FIG. 3 is a block diagram showing the LJ1 system, the data coordination server, and the monitoring control system. As shown in FIG. 2, the monitoring control system 14 is provided with the transmission monitoring control server 21 and the distribution monitoring control server 22. The transmission monitoring control subsystem (shown in FIG. 7 later) is one subsystem that is executed on the computer of the transmission monitoring control subsystem. 21. The transmission monitoring control subsystem performs transmission monitoring control of, for example, one local system 5. By executing a plurality of transmission monitoring control subsystems on one transmission monitoring control server 21, transmission monitoring control of a plurality of local systems is realized with a single transmission monitoring control server 21.

The distribution monitoring control subsystem is one distribution monitoring control subsystem that is executed on the computer of the distribution monitoring control server 22. The distribution monitoring control subsystem performs distribution monitoring control of one local system 5 for example. By executing a plurality of distribution monitoring control subsystems on one distribution monitoring control server 22, distribution monitoring control of a plurality of local systems is realized with a single distribution monitoring control server 22.

The distribution monitoring control subsystem and the transmission monitoring control subsystem are each provided with an outage plan management unit 31 and an operation unit 32. The outage plan management unit 31 of the system monitoring control subsystem manages the outage plan names and operation names of the power transmission system. The operation unit 32 of the transmission monitoring control subsystem manages operations of the power transmission system. The outage plan management unit 31 of the distribution monitoring control subsystem manages the outage plan names and operation names of the power distribution system. The operation unit 32 of the distribution monitoring control subsystem manages operations of the power distribution system.

The LJ1 system 18 transfers system outage plan information to the data coordination server 11. The system outage plan information is a piece of information that represents an outage plan registered by an operator such as facilities to be stopped and stop periods, for an occasion of stopping electric power facilities such as an electric power station and transmission lines. The system outage plan information is a set of data of in a predetermined format (for example, CSV format). An LJ1 coordination data reception processing unit 33 of the calculation server 23 imports system outage plan information from the data coordination server 11 at a predetermined cycle. The LJ1 coordination data reception processing unit 33 converts and edits the system outage plan information, and associates it with a facility DB. For example, the LJ1 coordination data reception processing unit 33 performs setting data conversion (correction) on the imported system outage plan information, using preliminarily registered definition information (for example, maintenance dictionary definition). Moreover, the LJ1 coordination data reception processing unit 33 determines whether or not there is an error in the system outage plan information.

The calculation server 23 requests the outage plan management unit 31 of the monitoring control system 14 to register the outage plan name imported by the LJ1 coordination data reception processing unit 33. The outage plan management unit 31 (an outage plan name registration unit 34 shown later in FIG. 7) registers, on the calculation server 23, the outage plan name based on the system outage plan information imported by the LJ1 coordination data reception processing unit 33. The outage plan management unit 31 registers the outage plan name on the calculation server 23 if there is no error in the outage plan name imported by the LJ1 coordination data reception processing unit 33. Furthermore, the outage plan management unit 31 corrects the system outage plan information if there is an error in the system outage plan information imported by the LJ1 coordination data reception processing unit 33. Moreover, the outage plan management unit 31 registers, on the calculation server 23, the outage plan name based on the corrected system outage plan information. Further, the outage plan management unit 31 (operation name registration unit 38 shown later in FIG. 7) registers the outage plan name on the monitoring control system 14 as an operation name.

In addition, the outage plan managing unit 31 manages states such as outage decision and work stoppage and performs information handover to the operation unit 32, based on the system outage plan information. The outage plan management unit 31 creates an outage plan name on the basis of operator's input of information related to a scheduled work stop operation, a running-stop operation, or a system change operation. The scheduled work stop operation mentioned above is an operation involved in scheduled work such as construction work and inspection. The running-stop operation mentioned above is an operation to stop the running of an electric power facility for a certain period of time. The system change operation mentioned above is an operation to change the connection of the electric power facility. In the outage plan names, the name data of transmission monitoring control and distribution monitoring control are managed in a centralized manner, and the operator can make reference to all names irrespective of the location where operation is being performed.

Figure 4:
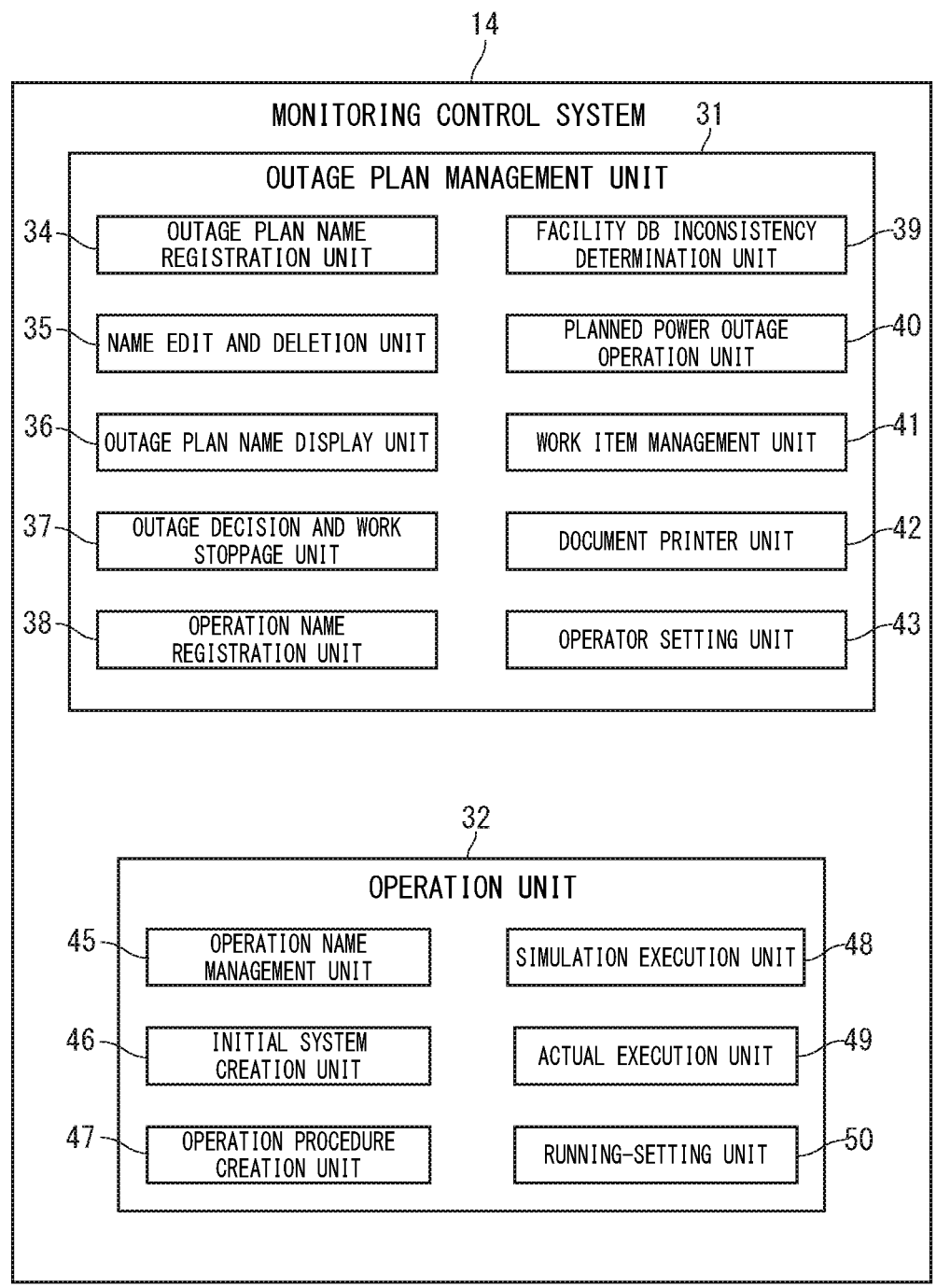
FIG. 4 is a block diagram showing a functional configuration of the monitoring control system according to the embodiment.

FIG. 4 is a block diagram showing the monitoring control system. The outage plan management unit 31 is provided with the outage plan name registration unit 34, an outage plan name edit and deletion unit 35, an outage plan name display unit 36, an outage decision and work stoppage unit 37, an operation name registration unit 38, a facility DB inconsistency determination unit 39, a planned power outage operation unit 40, a work item management unit 41, a document printer unit 42, and an operator setting unit 43.

The outage plan name registration unit 34 converts an outage plan name into a common data format usable in each of the transmission monitoring control subsystem and the distribution monitoring control subsystem. The outage plan name registration unit 34 creates an outage plan name corresponding to identification information of outage plan name information, based on at least one of: information related to an outage plan input by the operator; system outage plan information imported from the LJ1 system 18; and information supplied from the distribution information management system 19. FIG. 5 is a conceptual diagram showing outage plan names and outage plan information. A "Plan No." as identification information is assigned to each outage plan information. The "Plan No." is assigned according to the load-dispatching office classification, the operation classification, the outage type, the month, the serial number, the branch number, and so forth. Here, for the purpose of explanation, the "Plan No." is expressed as a positive integer such as 1, 2, 3 . . . .

The outage plan information includes information of "Operation Station" and "Facility name". For example, in the outage plan information with the "Plan No." being "1", the "Operation Station" is "Region A" and the "Facility Name" is "Substation A, Transformer No. 1". The outage plan name registration unit 34 generates, for example, "No. 1 Transformer Outage Plan" as an "Outage Plan Name" based on the outage plan information with the "Plan No." being "1". The outage plan name registration unit 34 registers the "Plan No. 1" and the "Outage Plan Name" while associating them with each other.

The outage plan name edit and deletion unit 35 edits or deletes the registered outage plan name according to a request from the operator. The outage plan name display unit 36 outputs various types of information such as a list of registered outage plan names and an individual detailed information view to its display unit and displays images showing the various types of information on the display unit.

In response to the request from the operator, the outage decision and work stoppage unit 37 sets a status (state) such as outage decision or work stoppage for the registered outage plan name. The operation name registration unit 38 registers the outage plan name as an operation name in response to a request from the operator. The operation name registration unit 38 registers the operation name in another database that is different from the one on which the outage plan name registration unit 34 registers outage plan names. If a change is made to a system facility due to maintenance, the facility DB inconsistency determination unit 39 detects whether or not the registered outage plan names are affected, and if there is an affected one, it suppresses operations of this outage plan name. The planned power outage operation unit 40 executes an outage operation, a transmission operation, or a monitoring operation of the specified outage plan name. At the time of implementing a power outage, the planned power outage operation unit 40 sets a group of preliminarily registered operation target switches for a panned power outage name and a post transmission monitoring name, and executes the above processing.

The work item management unit 41 creates work items on the basis of the outage plan names. Moreover, the work item management unit 41 displays a work schedule table and sets work contents. The document printer unit 42 outputs various types of information such as outage plan name and planned power outage information to a printer, and causes the printer to print these various types of information. The operator setting unit 43 displays or edits definition data used by the monitoring control system 14 in response to the request from the operator.

The operation unit 32 creates an operation name on the basis of the outage plan name notified by the outage plan management unit 31. The operation name is, for example, a name which consolidates (combines) respective outage plan names into a series of operations. The operation name may be generated for a single outage plan name in some cases. Furthermore, a plurality of operation names may be combined in the same subsystem in some cases, and may be combined between different subsystems. The operation names related to monitoring control of the power transmission system (transmission monitoring control) fall into types including "Scheduled Outage Operation", "Running-Stop Operation", "System Running Operation", "On-Demand Operation", and "Direct Selection Operation".

The operation name of the "Scheduled Outage Operation" is a name for creating an operation procedure on the basis of an outage plan name decided by an outage plan. The operation procedure is a piece of information that defines a series of operations for implementing operation and control of the electric power system according to operation instructions of the load-dispatching office 6 of the respective area controls. The operation name of the "Running-Stop Operation" is a name for creating the above operation procedure on the basis of a running-stop operation that is decided by the outage plan. The operation name of the "System Change Operation" is a name for creating the operation procedure on the basis of an outage plan name and a system change name decided by a system change plan.

The operation name of the "System Running Operation" is a name for creating a procedure of an operation according to the need for running the system such as a re-transmission operation in the event of an accident, a voltage adjustment operation, a protection relay operation, and an operation of using or locking a local automatic operation device, and the purpose of the name is to perform the operation. The operation related to the "System Running Operation" can actually be executed without an approval on the system. The operation name of the "On-Demand Operation" is a name for implementing an unplanned operation that occurred suddenly, such as an operation in the event of an accident. The "Direct Selection Operation" is a name for selecting a device from a system diagram and directly controlling a device that can be operated online, without preliminarily creating an operation procedure and an individual operation procedure for a device.

Moreover, the operation names related to monitoring control of the power distribution system (distribution monitoring control) fall into types including "Scheduled Outage Operation", "Running-Stop Operation", "System Change Operation", "Distribution Device Operation", "Direct Selection Operation", and "Accident Recovery Operation". The "Scheduled Outage Operation", the "Running-Stop Operation", the "System Change Operation", and the "Direct Selection Operation" are similar to those of the transmission monitoring control described above. The operation name of the "Distribution Device Operation" is a name for operating a distribution line device on the basis of an electric line outage/switch plan information. The "Accident Recovery Operation" is a name for restoring distribution sections that include no accident among the distribution sections where power outage has occurred due to an accident, by switching the distribution lines.

Moreover, operation names related to maintenance of facilities managed by the monitoring control system 14 include "Scheduled Outage Operation", "Running-Stop Operation", "On-DemandOperation", and"DirectSelection-Operation" as with the above transmission monitoring control.

The operation unit 32 creates operation procedures of work stop or restoration work for buses, transmission lines, and so forth, on a name-by-name basis, and executes the names automatically. The operation unit 32 includes an operation name management unit 45, an initial system creation unit 46, an operation procedure creation unit 47, a simulation execution unit 48, an actual execution unit 49, and a running-setting unit 50.

The operation name management unit 45 creates an operation name upon being notified from the outage plan management unit 31. FIG. 6 is a conceptual diagram showing operation names. An "Operation No." as identification information is assigned to each operation name. The "Operation No." is assigned according to the system identification number, month, serial number, and the like. Here, for the purpose of explanation, the "Operation No." is expressed as a positive integer such as 1, 2, 3 . . . .

The operation name management unit 45 associates and manages "Plan No.", which is the identification information of the outage plan name notified from the outage plan management unit 31 (refer to FIG. 5) with "Operation No." created by the operation unit 32. For example, the operation name management unit 45 assigns "1" as the "Operation No." to the outage plan name with the "Plan No." being "1". The operation name management unit 45 generates an "Operation Name A" as the "Operation Name" of which the "Operation No." is "1". The operation name management unit 45 associates and manages "Operation No.", "Operation Name", "Plan No.", and "Operation Procedure". [That is to say,] For example, the operation name management unit 45 associates and manages various types of information such that where the "Operation No." is "2", the "Operation Name" is "Operation Name C", the "Plan No." is "3", and the "Operation Procedure." is "TH".

Furthermore, an operation name includes a "Name State" that indicates the administrative state of the operation name. The "Name State" is a state such as: being edited; created; assessment pending; approval pending; approved; waiting for operation; in progress; being aborted; and operation performed.

The operation name management unit 45 is notified of an outage decision or a work stoppage by the outage plan management unit 31, and updates the operation name. Moreover, the operation name management unit 45 accepts, copies, combines, returns, deletes, assesses, approves, and searches for manual creation of an operation name. Assessment and approval are operations of accepting an action to be confirmed for an operation name by a manager such as a chief director. Furthermore, the operation name management unit 45 causes printing of an operation name to be executed. In addition, the operation name management unit 45 sets a mode for the direct selection operation from the online system diagram, and saves the control content as a directly selected operation name when implementing an individual operation. In addition, the operation name management unit 45 is notified for each operation name and updates the state of the name. Also, the operation name management unit 45 registers on the file server 15 information that indicates that when the operation is completed, the notification from the actual execution unit 49 has been received and the operation has been completed.

Moreover, the operation name management unit 45 determines whether or not facility DB information notified from a maintenance duty and associated with an operation name matches the content of the facility DB. If the screen disappears as a result of an accident that occurs while a procedure is being edited, the operation name management unit 45 saves the procedure being edited in a retreat area. Furthermore, the operation name management unit 45 is notified of a request for determining whether or not switching can be performed from the distribution information management system 19 (refer to FIG. 2) via the data coordination server 11, and returns a determination result as a response to this notification.

The initial system creation unit 46 creates initial system information. The initial system information is a piece of information of a system state that serves as a basis when creating an operation procedure and/or performing procedure check. The initial system information includes a device state and a load state. The initial system creation unit 46 reads out outage plan names up to a scheduled date and time from the calculation server 23, executes a simulation in the simulation execution unit 48 described later, and accumulates system states to create the initial system information. The operation procedure creation unit 47 automatically creates an operation procedure, based on the information of facilities to be stopped for which an automatic procedure creation request has been notified and which is included in the outage plan name. Moreover, upon being notified of a manual procedure creation request, the operation procedure creation unit 47 accepts editing of the operation procedure.

Upon being notified of a simulation execution start request, the simulation execution unit 48 starts a simulation execution. The simulation execution is a process of expanding and checking the created operation procedure on a simulated system for each procedure. The simulation execution unit 48 performs a simulation execution check for each operation procedure (affected name search check or procedure check) and performs the operations on the simulated system. Based on the approved operation name data, the simulation execution unit 48 executes the simulation before performing the actual execution described below. The simulation execution unit 48 may perform the simulation execution by user's designation.

Upon being notified of an actual execution start request, the actual execution unit 49 starts an actual execution. The actual execution is to perform a pre-operation check and then execute one procedure at a time according to the operation procedure while checking each operation procedure. Moreover, during the actual execution, when the state of the operation target facility (for example, substation, switch) has changed automatically (for example, when a change in the state has been detected automatically), the actual execution unit 49 determines whether or not to stop the actual execution. When the actual execution has finished, the actual execution unit 49 counts up the number of executions performed as post-processing and saves the numerical value for a prolonged period of time. Furthermore, the actual execution unit 49 changes sets a mode for the system running operation from the online system diagram, and the running-setting unit 50 that creates and executes a procedure saves running-setting information related to the operation unit 32 and performs output when the running-setting information is changed.

Figure 7:
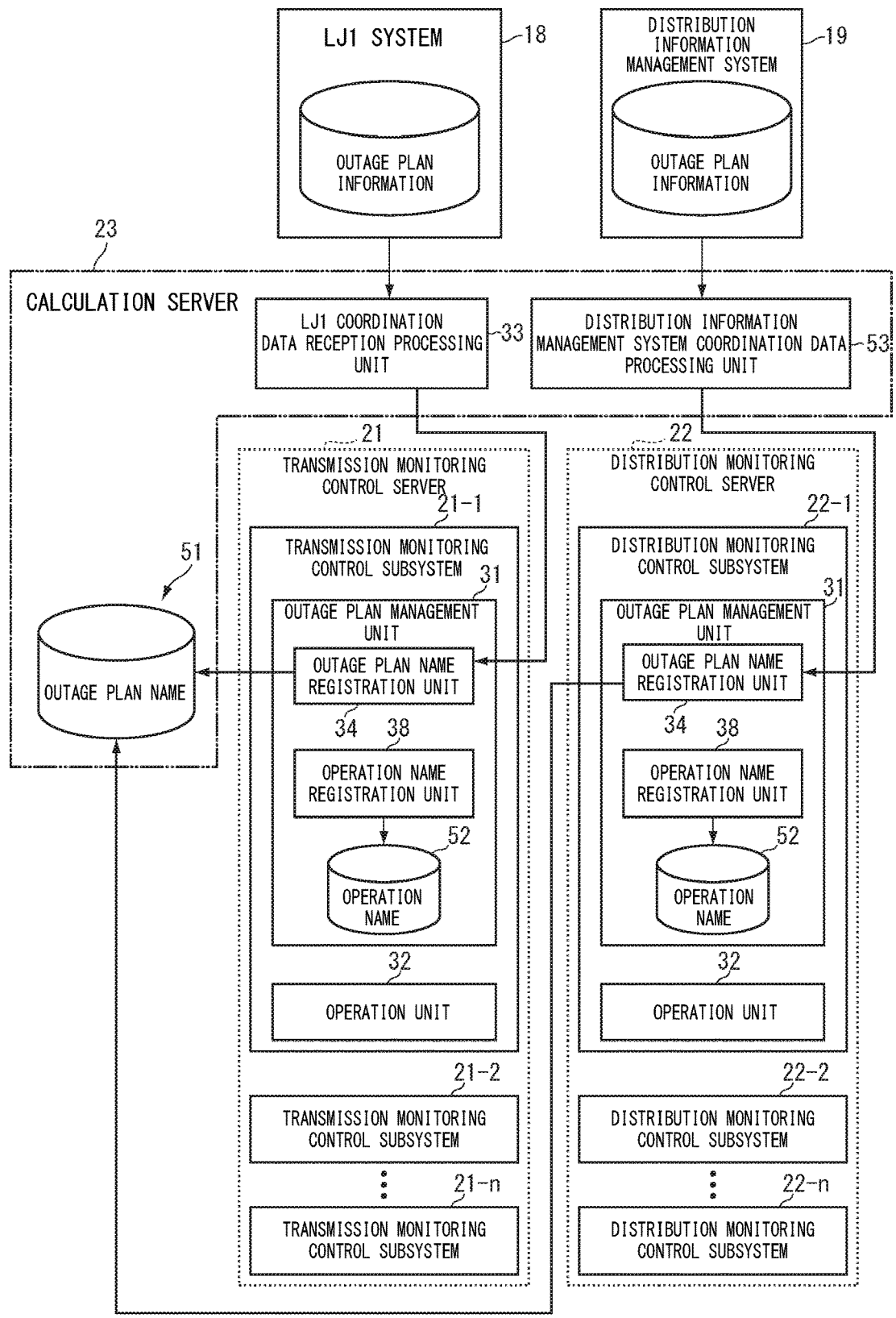
FIG. 7 is a diagram showing operations related to an outage plan of the monitoring control system according to the embodiment.

Next, operations of the monitoring control system 14 related to outage plans will be described. FIG. 7 is a diagram showing the operations of the monitoring control system according to the embodiment. The data coordination server 11 (refer to FIG. 2) acquires system outage plan information from the LJ1 system 18. The LJ1 coordination data reception processing unit 33 imports the system outage plan information stored in the data coordination server 11 into the calculation server 23 at a predetermined cycle. The LJ1 coordination data reception processing unit 33 performs setting data conversion (correction) on the imported system outage plan information, using the definition information. Moreover, the LJ1 coordination data reception processing unit 33 associates the facility information included in the system outage plan information with the information stored in the facility DB. In this manner, the LJ1 coordination data reception processing unit 33 converts the received system outage plan information into a data format that can be used by the operation unit 32. The outage plan management unit 31 generates an outage plan name by editing the system outage plan information.

Further, the outage plan management unit 31 changes the outage plan name in response to a request from the operator, and newly documents the changed name data. Moreover, the outage plan management unit 31 registers the name data included in the outage plan information received from the LJ1 system 18 and the documented name data, as "Outage Plan Name A" and "Outage Plan Name B". In addition, the outage plan management unit 31 performs a check processing and extracts related parts at the time of registration.

Furthermore, the outage plan management unit 31 notifies the operation unit 32. Examples of this notification include: a notification of requesting registration of an outage plan name as an operation name in a DB 52; a notification of requesting to change an outage plan name registered as an operation name; a notification of requesting to reflect an outage decision; a notification of requesting to reflect outage decision cancellation; and a notification of requesting to reflect work stoppage.

The operation unit 32 registers the outage plan name as an operation name in the DB 52 in response to the request from the outage plan management unit 31. The operation name is generated so as to be associated with the outage plan name. Examples of outage plan names registered in a DB 51 include "No. 1 transformer outage plan" and "Distribution Line Section 1 Outage Plan", and examples of operation names registered in the DB 52 include "No. 1 Transformer Stop Operation" and "Distribution Line Section 1 Outage Operation".

In FIG. 7, reference signs 21-1, 21-2, . . . 21-n respectively denote transmission monitoring control subsystems on the transmission monitoring control server 21. The transmission monitoring control subsystems 21-1, 21-2, . . . 21-n respectively correspond to logical computers configured on the transmission monitoring control server 21. The LJ1 coordination data reception processing unit 33 of the calculation server 23 acquires system outage plan information. The calculation server 23 requests the outage plan management unit 31 of the transmission monitoring control subsystem 21-1 to register the outage plan name on the basis of the outage plan information imported by the LJ1 coordination data reception processing unit 33. The outage plan name registration unit 34 of the transmission monitoring control subsystem 21-1 registers, on the calculation server 23, the outage plan name based on the outage plan information imported by the LJ1 coordination data reception processing unit 33. Further, the operation name registration unit 38 of the transmission monitoring control subsystem 21-1 registers the outage plan name as an operation name on the DB 52 of the transmission monitoring control subsystem 21-1.

In addition, in the transmission monitoring control subsystem 21-1, the operation unit 32 notifies relevant locations when a notification related to an outage decision or work stoppage is received from the outage plan management unit 31. In the transmission monitoring control subsystem 21-1, the operation unit 32 notifies the outage plan management unit 31 through an operation name change and deletion processing. Examples of this notification include: a notification of an outage plan name having been changed in the operation unit 32 of the transmission monitoring control subsystem 21-1; a notification of the operation of the operation name having been implemented; a notification of the operation of the operation name having been completed; and a notification of the operation name having been automatically due to the time elapsed or having been manually deleted. In the transmission monitoring control subsystem 21-1, in response to the notification from the operation unit 32, the outage plan management unit 31 reflects the content of the notification on the outage plan name stored in the DB 51 or on the operation name stored in the DB 52.

Moreover, in FIG. 7, reference signs 22-1, 22-2, . . . 22-n respectively denote distribution monitoring control subsystems on the distribution monitoring control server 22. The distribution monitoring control subsystems 22-1, 22-2, . . . 22-n respectively correspond to logical computers configured on the distribution monitoring control server 22.

An distribution information management system coordination data processing unit 53 of the calculation server 23 acquires distribution outage plan information from the distribution information management system 19. The distribution information management system coordination data processing unit 33 converts and edits distribution outage plan information and associates it with a facility DB by means of a processing similar to that of the LJ1 coordination data reception processing unit 33. The calculation server 23 requests the outage plan management unit 31 of the distribution monitoring control subsystem 22-1 to register the outage plan name. The outage plan name registration unit 34 of the distribution monitoring control subsystem 22-1 registers the outage plan name based on the outage plan information imported by the distribution information management system coordination data processing unit 53, on the calculation server 23 via the outage plan management unit 31 of the distribution monitoring control subsystem 22-1. Further, the operation name registration unit 38 of the distribution monitoring control subsystem 22-1 registers the outage plan name as an operation name on the DB 52 of the distribution monitoring control subsystem 22-1 via the outage plan management unit 31 of the distribution monitoring control subsystem 22-1.

Figure 8:
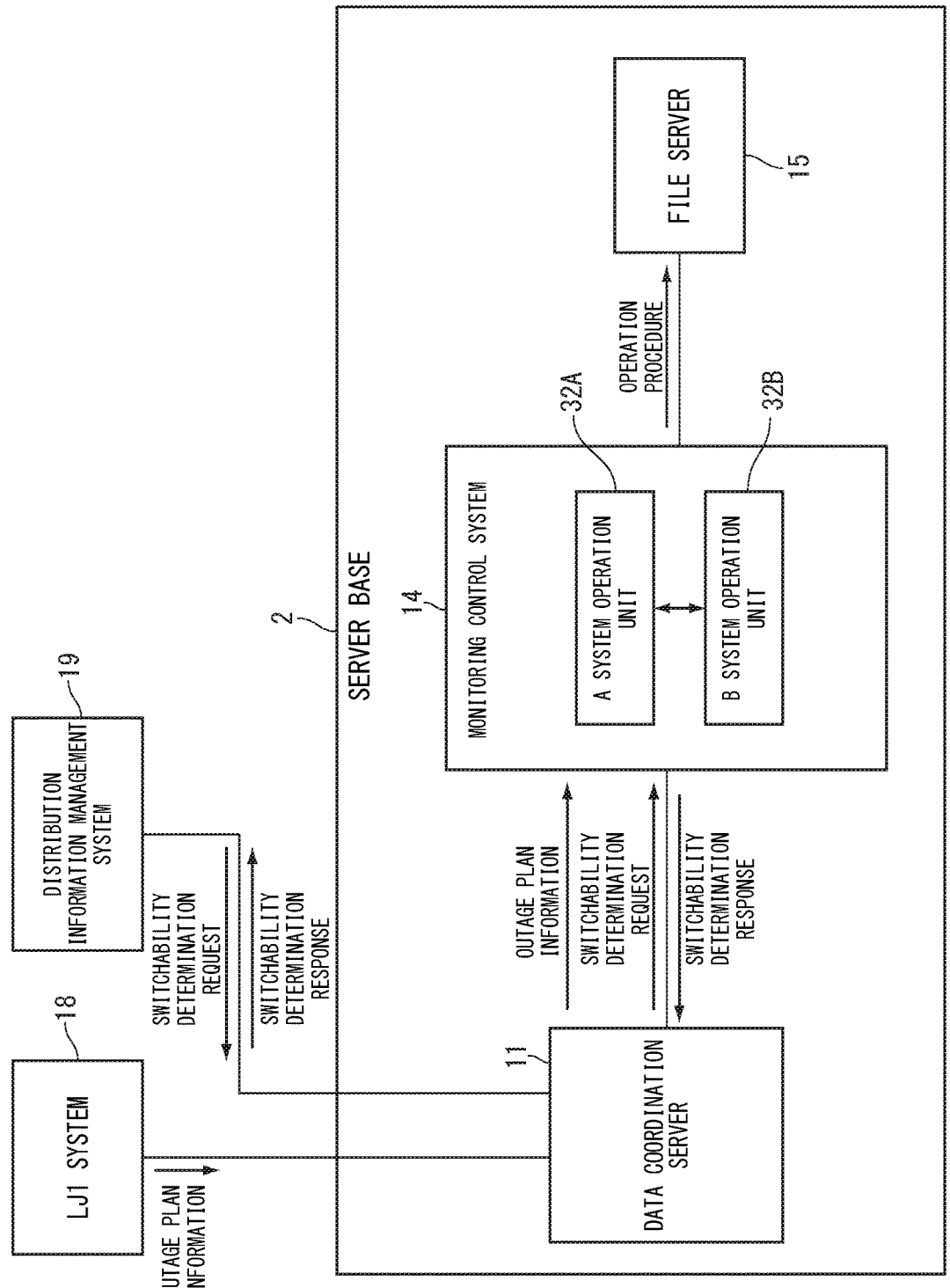
FIG. 8 is a diagram showing operations related to a system operation of the monitoring control system according to the embodiment.

Next, operations of the monitoring control system 14 related to the system operation will be described. FIG. 8 is a diagram showing operations related to the system operation of the monitoring control system according to the embodiment. The distribution information management system 19 transmits to the data coordination server 11 a switchability determination request that requests for a switching determination as to whether or not the corresponding outage plan information is executable when creating new outage plan information. The switchability determination is a process of determining whether or not an operation procedure based on a new outage plan name can be executed. That is to say, the switchability determination is a process of determining whether or not an operation of the facility in the power distribution system can be executed. For example, the switchability determination is a determination as to whether or not the power supply path can be switched for a specified distribution section in the power distribution system. The LJ1 system 18 may in some cases transmit to the data coordination server 11 a switchability determination request that requests for a switching determination as to whether or not the new outage plan information is executable.

Figure 9:
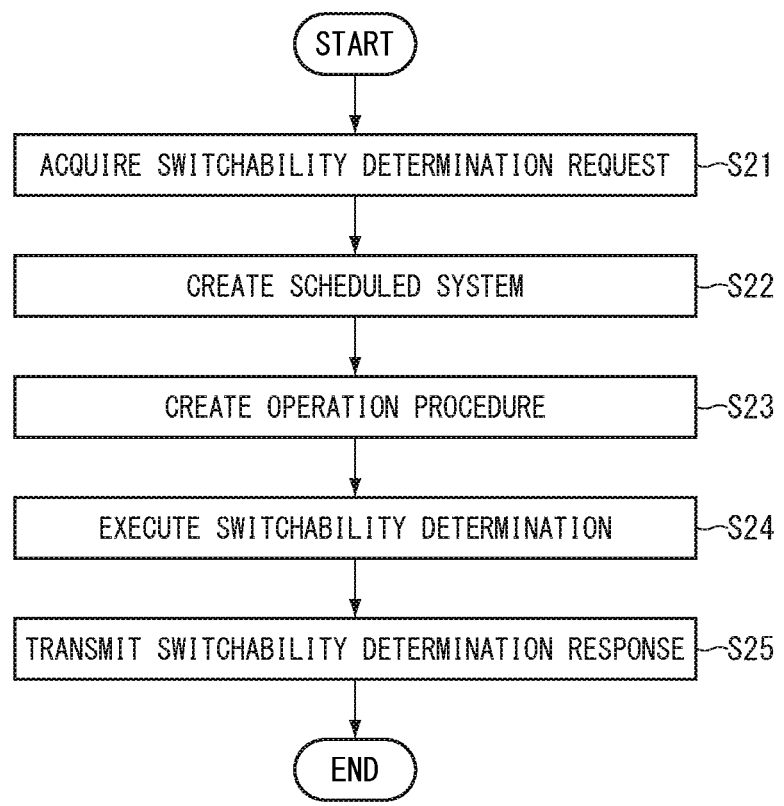
FIG. 9 is a flowchart showing an operation of the monitoring control system related to a switchability determination.

FIG. 9 is a flowchart showing an operation of the monitoring control system related to the switchability determination.

In Step S21, the operation name management unit 45 of the operation unit 32 acquires a switchability determination request from the data coordination server 11. The switchability determination request includes the outage plan name. In Step S22, the operation unit 32 creates a scheduled system on the basis of the date and time at which the new outage plan name included in the switchability determination request is scheduled. The scheduled system is created by the initial system creation unit 46 (refer to FIG. 3) in a manner similar to that of the initial system. In Step S23, the operation unit 32 automatically creates an operation procedure that shows a procedure of operating a device provided in the power distribution system (a distribution device procedure), based on the new outage plan name included in the switchability determination request. In Step S24, the operation name management unit 45 of the operation unit 32 determines items such as occurrence/non-occurrence of voltage deviation and occurrence/non-occurrence of overload, based on the operation procedure created from the scheduled system and the new outage plan name. The operation name management unit 45 of the operation unit 32 creates a switchability determination response that indicates the determination result. In Step S25, the operation name management unit 45 of the operation unit 32 transmits the switchability determination response to the distribution information management system 19 via the data coordination server 11.

Figure 10:
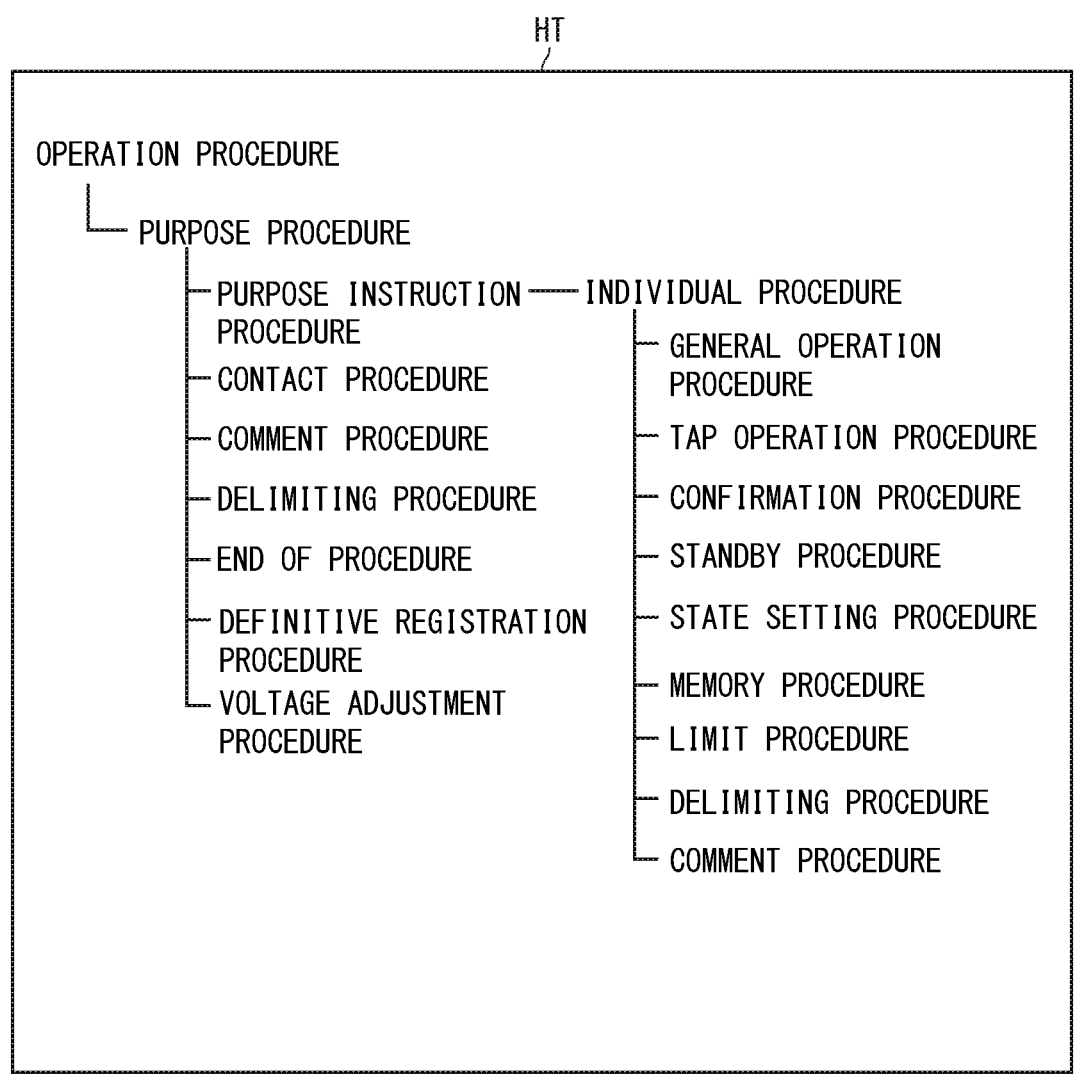
FIG. 10 is a conceptual diagram showing an operation procedure according to the embodiment.

Moreover, the operation unit 32 automatically creates an operation procedure of the specified operation name. FIG. 10 is a conceptual diagram showing the operation procedure according to the embodiment. An operation procedure HT includes "Purpose Procedure" and "Individual Procedure". The "Purpose Procedure" is a procedure showing the purpose of the operation and includes the following items. A "Purpose Instruction Procedure" is a procedure for performing a purpose operation. A "Contact Procedure" is a procedure for contacting a relevant operation station. A "Comment Procedure" is a procedure for displaying contents such as confirmation items or supplementary items. A "Delimiting Procedure" is a procedure for enhancing the visibility of the operation procedure. A "End of Procedure" is a procedure for showing the end position of the operation procedure. A "Definitive Registration Procedure" is a procedure for performing DB switching. A "Voltage Adjustment Procedure" is a procedure for performing voltage adjustment at the time of loop switching in a distribution monitoring control management control subsystem.

Moreover, the "Individual Procedure" is a procedure for individually operating a device and includes the following items. A "General Operation Procedure" is a procedure for directly controlling various types of devices such as CB (circuit breaker) and LS (line switch). A "Tap Operation Procedure" is a procedure for controlling tap changer parallelization, tap changer change, and voltage matching. A "Confirmation Procedure" is a procedure for automatically or manually confirming the values of SV and/or TM. A "Standby Procedure" is a procedure for showing a standby time (second). A "State Setting Procedure" is a procedure for setting or canceling states such as work in progress, test in progress, operation prohibited, and state change masking. A "Memory Procedure" is a procedure for saving the state of the specified device, and is called in the confirmation procedure and operation procedure. A "Limit Procedure" is a procedure for lowering a tap changer until the limit display appears. A "Delimiting Procedure" is a procedure for enhancing the visibility of the operation procedure. A "Comment Procedure" is a procedure for displaying contents such as confirmation items or supplementary items.

Returning to the description of FIG. 8, in the monitoring control system 14, a plurality of logical computers (A system operation unit 32A, B system operation unit 32B) according to the range of the operation target cooperates with each other, and creation and execution of an operation name are performed. Here, the A system operation unit 32A is a management system that gives instructions when creating and executing an operation name for which the A system operation unit 32A cooperates with the B system operation unit 32B. Moreover, the B system operation unit 32B is an associated system that receives instructions from the management system when creating and executing an operation name for which the B system operation unit 32B cooperates with the A system operation unit 32A.

For example, the management system and the associated system are the local systems 5 each corresponding to an area control that includes one load-dispatching office 6 (refer to FIG. 2), or are systems each corresponding to a regional area control that includes one control station 8. The number of associated systems is determined by the operation target area and may be two or more in some cases.

The monitoring control system 14 sets the management system and the associated system on the basis of the outage plan information. The monitoring control system 14 requests the A system operation unit 32A (management system) for name registration and does not request the B system operation unit 32B (associated system) for name registration. The A system operation unit 32A creates an operation name and operation procedure on the basis of the received outage plan name. The A system operation unit 32A performs a simulation execution, assessment, and approval on the basis of the created operation procedure. The monitoring control system 14 may be configured so that the operator can manually change the management system.

The A system operation unit 32A notifies the B system operation unit 32B after completion of the assessment, and the operation name created by the A system operation unit 32A can be referred to or edited by the B system operation unit 32B. Then, the A system operation section 32A and the B system operation section 32B cooperates with each other to edit the procedure of the associated system and performs a simulation execution, or assessment and approval. The actual execution becomes possible after completion of an approval has been made in all associated systems. The monitoring control system 14 transmits the created operation procedure to the file server 15 (data warehouse). Moreover, the A system operation unit 32A and the B system operation unit 32B cooperates with each other to execute the operation procedure.

Figure 11:
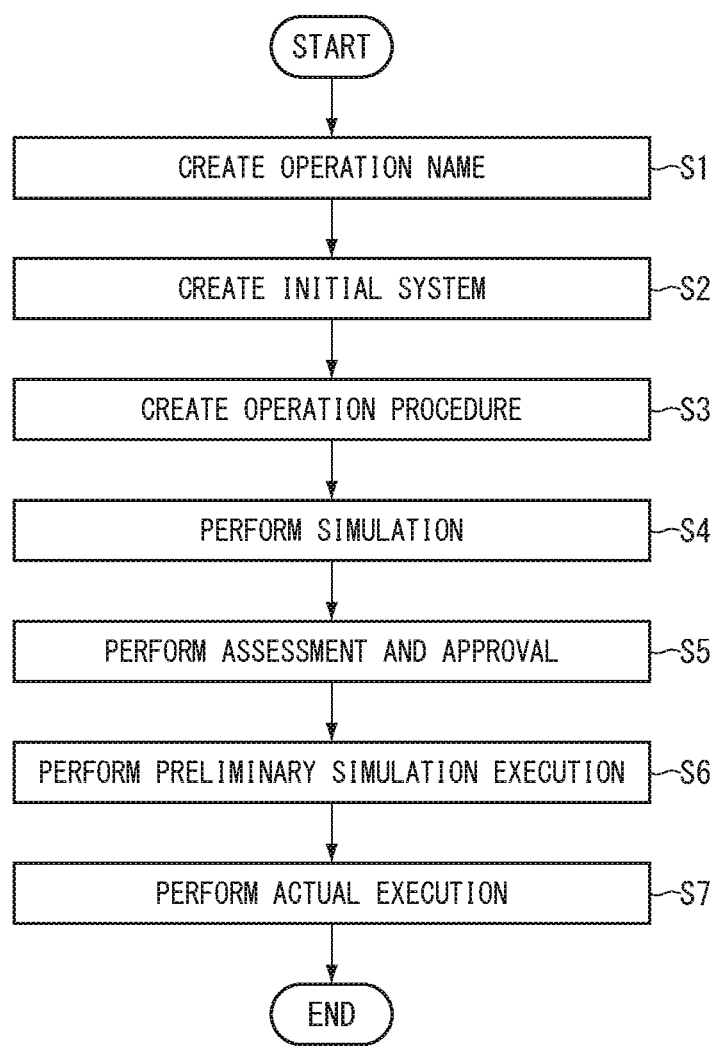
FIG. 11 is a flowchart showing an operation of the system operation unit according to the embodiment.
Figure 12:
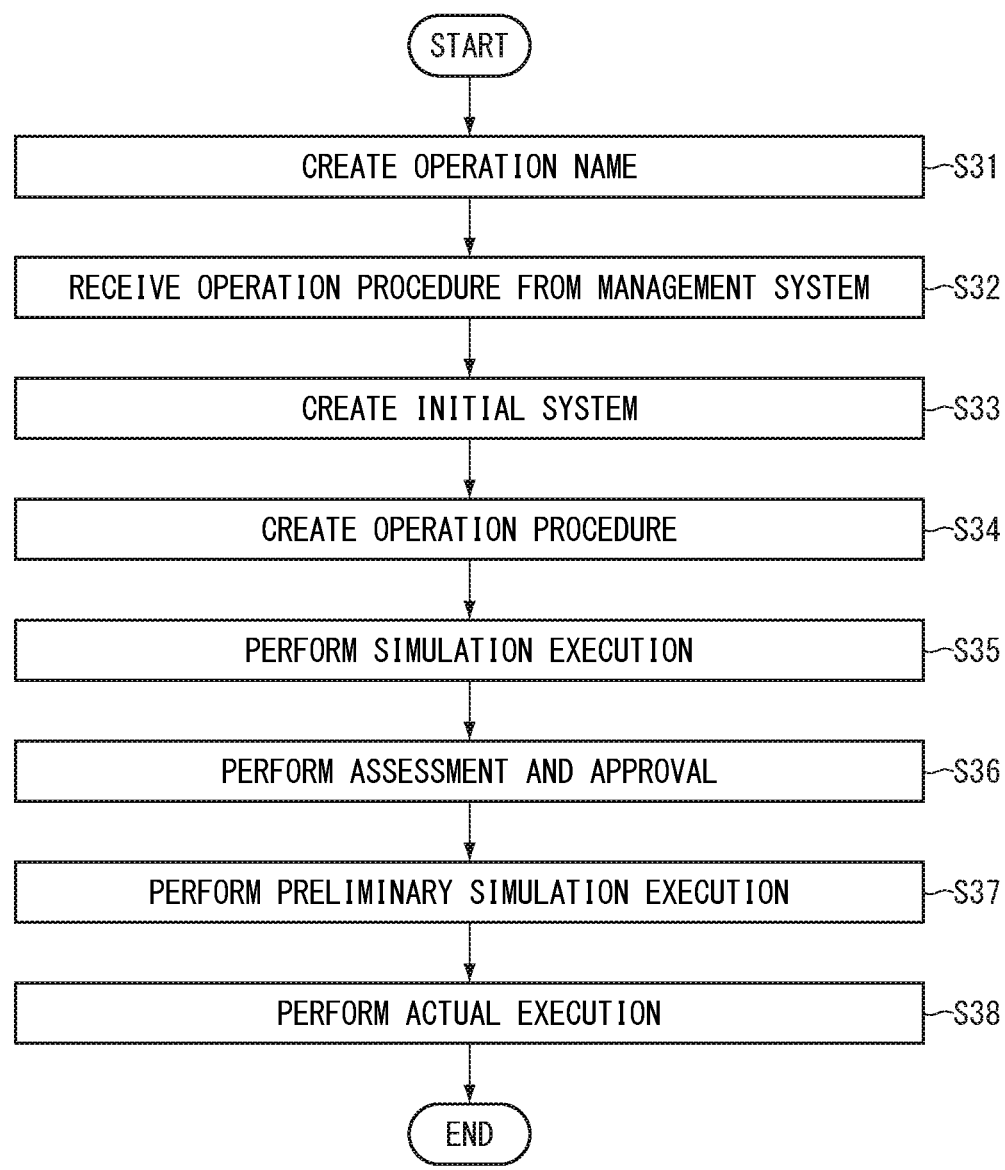
FIG. 12 is a flowchart showing an operation of the system operation unit according to the embodiment.

Next, an operation of the operation unit will be described. FIG. 11 and FIG. 12 are flowcharts each showing an operation of the system operation unit according to the embodiment. In Step S1, the operation unit 32 creates an operation name. When the associated system is set, the operation unit 32 transmits the operation procedure to the associated system. It is assumed that the associated system is not set for Step S2 and thereafter in FIG. 11. The case where the associated system is set will be described with reference to FIG. 12.

In Step S2, the operation unit 32 creates an initial system. In Step S3, the operation unit 32 creates an operation procedure. In Step S4, the operation unit 32 performs a simulation execution. In Step S5, the operation unit 32 accepts an assessment and approval. In Step S6, the operation unit 32 performs a preliminary simulation execution under the assessed and approved condition. In Step S7, the operation unit 32 performs an actual execution.

Next, the case where the associated system is set is described. In Step S31, the operation unit 32 of the associated system creates an operation name. In Step S32, the operation unit 32 of the associated system receives an operation procedure of a power transmission system from the management system. In Step S33, the operation unit 32 of the associated system creates an initial system. In Step S34, the operation unit 32 of the associated system creates an operation procedure that has combined the operation procedure from the management system, based on the initial system. In Step S35, the operation unit 32 of the associated system performs a simulation execution of the operation procedure. In Step S36, the operation unit 32 of the associated system accepts an assessment and approval of the operation procedure. In Step S37, the operation unit 32 of the associated system performs a preliminary simulation execution of the operation procedure under the assessed and approved condition. In Step S38, the operation unit 32 of the associated system performs an actual execution of the combined operation procedure.

Figure 13A:
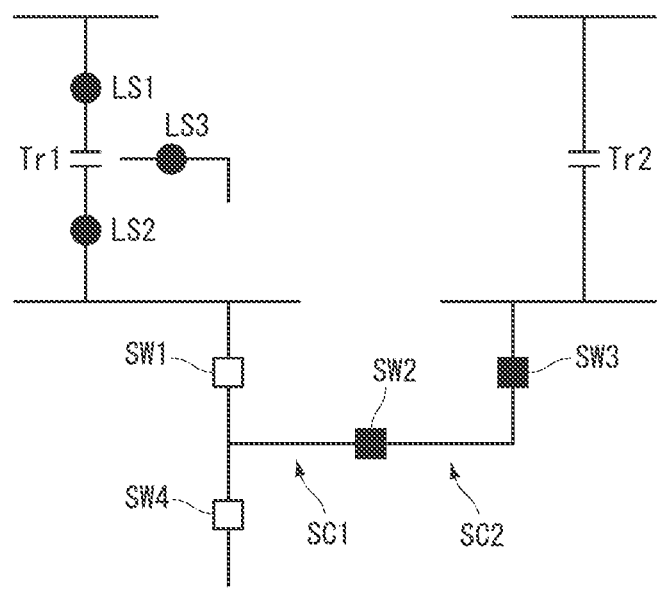
FIGS. 13A and 13B are diagrams showing a process of combining operation names of distribution monitoring control according to an operation name of transmission monitoring control.
Figure 13B:
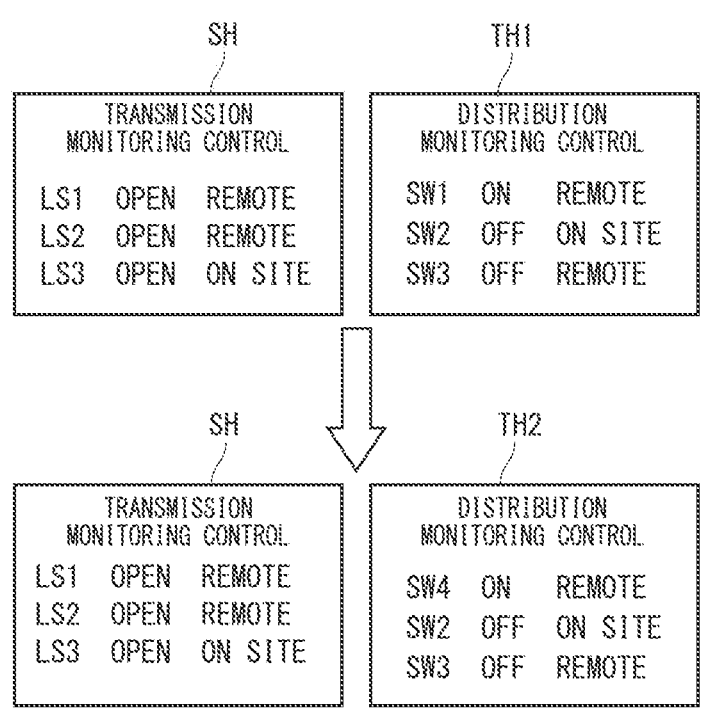

In addition, the operation unit 32 can also combine (adjust) an operation name of the facility created on the basis of the outage plan information (an operation name of the transmission monitoring control) and an operation name of the facility created on the basis of the operation information (an operation name of the distribution monitoring control). FIGS. 13A and 13B are diagrams showing an example of processes of a system monitoring control subsystem and a distribution monitoring control subsystem in the case where the operation name of the transmission monitoring control subsystem and the operation name of the distribution monitoring control subsystem are combined. In the example of FIGS. 13A and 13B, the management system is the transmission monitoring control subsystem (system facility monitoring control of a control region), and the associated system is the distribution monitoring control subsystem (distribution facility monitoring control of the control region).

FIG. 13A is a diagram showing a state prior to the execution of the operation name. Reference signs Tr1 and Tr2 respectively denote a transformer. Reference signs LS1 and LS2 denote line switches connected to the transformer Tr1. Reference sign LS3 denotes a line switch or the like that is connected to the transformer Tr and cannot be controlled remotely. The line switch LS1, the line switch LS2, and the line switch LS3 are all in the state of receiving electric powered (closed state). Further, reference signs SW1, SW2, SW3, and SW4 respectively denote a section switch. The section switches in the ON state where electric power is being received are illustrated blackened, and the section switches in the OFF state where electric power is not being received are illustrated outlined. In the state of FIG. 13A, electric power is supplied from the transformer Tr2 to both the distribution section SC1 and the distribution section SC2.

Here, it is assumed that the "Operation Name A" shown in FIG. 6 is the No. 1 transformer stop operation (the operation to stop the transformer Tr' in FIG. 13A). It is also assumed that the "Operation Name C" shown in FIG. 6 is the distribution line section No. 1 outage operation (the operation to stop the distribution line section SC2 in FIG. 13A). In FIG. 13B, reference sign SH denotes an operation procedure of the transmission monitoring control, and reference sign TH1 denotes an operation procedure of the distribution monitoring control when the operation name of the transmission monitoring control is not combined.

In the example of FIG. 13B, the operation procedure SH of the transmission monitoring control includes an operation of remotely bringing the line switch LS1 and the line switch LS2 to the open state, and includes an operation of bringing the line switch LS3 to the open state on site. Further, the operation procedure TH1 of the distribution monitoring control includes an operation of remotely bringing the section switch SW1 to the ON state, an operation of bringing the section switch SW2 to the OFF state on site, and an operation of remotely bringing the section switch SW3 to the OFF state.

Now, there is assumed a case where the operation scheduled time of the operation procedure SH precedes the operation scheduled time of the operation procedure TH1. If the operation procedure SH of the transmission monitoring control is not scheduled, the distribution section SC1 receives electric power supplied from the transformer Tr1 upon closing the section switch SW1. However, if the operation procedure SH is scheduled, the distribution section SC1 cannot receive electric power supply by opening the line switch LS2.

In FIG. 13B, reference sign TH2 denotes an operation procedure of the distribution monitoring control that is adjusted according to the operation name of the transmission monitoring control. The operation procedure TH2 of the distribution monitoring control includes the operation of remotely bringing the section switch SW4 to the ON state, instead of the operation of bringing the section switch SW1 to the ON state in the operation procedure TH1 described above. Upon completion of the execution of the operation procedure TH2, electric section SC1 receives electric power supply from a system different from both the transformer Tr1 and transformer Tr2, by closing the section switch SW4 and opening the section switch SW3. Therefore, it is possible to minimize power outage to only the distribution section SC2.

When combining the operation names in this manner, the operation unit 32 of the associated system receives the operation procedure SH related to the transmission monitoring control from the management system in Step S32 of FIG. 12. The operation unit 32 of the associated system performs a simulation execution of the operation procedure SH and generates a candidate of the operation procedure TH2 on the basis of the initial system after the simulation execution (Step S34 of FIG. 12). The operation unit 32 of the associated system performs a simulation execution of the candidate of the operation procedure TH2 (Step S35 of FIG. 12). In the simulation execution of the candidate of the operation procedure TH2, the operation unit 32 determines whether or not all the processes corresponding to the operation procedure TH2 have been executed. If all the processes corresponding to the operation procedure TH2 are determined as having been executed in the simulation execution of the candidate of the operation procedure TH2, the operation unit 32 employs the candidate of the operation procedure TH2 as a legitimate operation procedure TH2.

As described above, among the transmission monitoring control subsystem and the distribution monitoring control subsystem, the operation unit 32 of one of the subsystems (the operation unit 32 of the associated system) creates an operation procedure (for example, the operation procedure TH2), based on the system in the case where the other subsystem (the management system) has executed the operation procedure (for example, the operation procedure SH).

In this manner, the operation unit 32 can combine operation names (for example, "Operation Name A" and "Operation Name C" in FIG. 6) of different management systems, and can generate one operation name that includes the procedures included in the two operation names.

In addition, the transmission monitoring control subsystem and the distribution monitoring control subsystem can cooperate with each other and the operation unit of each subsystem can execute an operation procedure. The operation unit of the system monitoring control subsystem can execute the operation procedure corresponding to the operation name, in cooperation with the distribution monitoring control subsystem the control right of which is not given.

Figure 14:
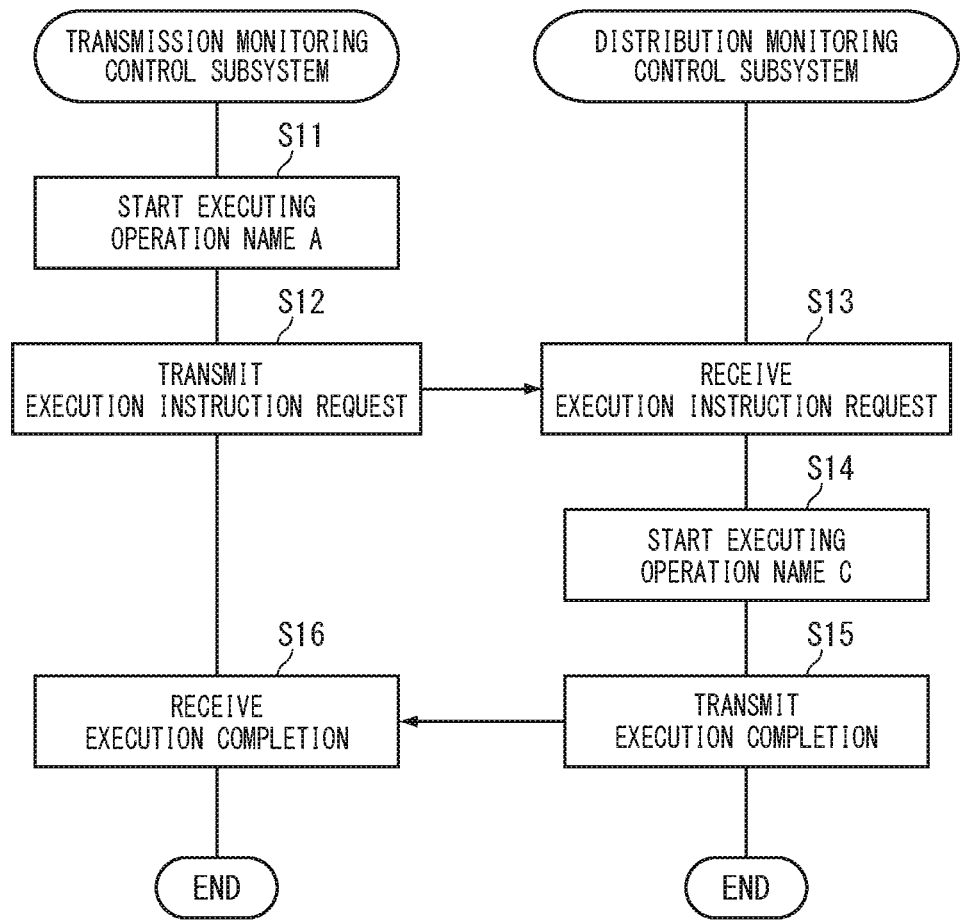
FIG. 14 is a sequence diagram showing coordination between the transmission monitoring control subsystem and the distribution monitoring control subsystem.

FIG. 14 is a sequence diagram showing coordination between the transmission monitoring control subsystem and the distribution monitoring control subsystem. In Step S11, the transmission monitoring control subsystem starts executing an operation name A. In Step S12, the transmission monitoring control subsystem transmits to the distribution monitoring control subsystem an execution instruction request for requesting an execution of a process corresponding to the operation name A.

In Step S13, the distribution monitoring control subsystem receives the execution instruction request of Step S12. In Step S14, the distribution monitoring control subsystem starts executing an operation name C related to the operation name A. Having completed the execution of the operation name C, in Step S15, the distribution monitoring control subsystem transmits to the transmission monitoring control subsystem a notification of the completion of the execution of the operation name C. In Step S16, the transmission monitoring control subsystem receives the notification of the execution completion of Step S15.

The technical scope of the present invention is not limited to the aspect described in the above embodiment. One or more of the requirements described in the above embodiment may be omitted. Further, the requirements described in the above embodiment may be combined appropriately. Also, to the extent permitted by applicable laws and regulations, the contents of Japanese Patent Application No. 2017-087104 and all documents cited in the above embodiment are hereby incorporated by reference.

DESCRIPTION OF REFERENCE SIGNS

1 Electric power system, 2 Server base, 3 Inter-base NW, 4 Wide area NW, 6 Load-dispatching office, 7 Branch station NW, Control station, 11 Data coordination server, 14 Monitoring control system, 19 Distribution information management system, 21 Transmission monitoring control server, Distribution monitoring control server, 23 Calculation server, 31 Outage plan management unit, 32 Operation unit

The invention claimed is:

1. A monitoring control system that performs monitoring control of power transmission systems and power distribution systems in a plurality of areas, the monitoring control system comprising:
   a transmission monitoring control server that is provided in each of the areas, the system monitoring control server including a plurality of transmission monitoring control subsystems that each perform monitoring control of the power transmission system in the area;
   a distribution monitoring control server that is provided in each of the areas, the distribution monitoring control server including a plurality of distribution monitoring control subsystems that each perform monitoring control of the power distribution system in the area;
   a calculation server that acquires, from an external system, information on outage plan of the power distribution system and information on outage plan of the power transmission system at a predetermined cycle, and stores to manage outage plan names related to outages of the power transmission system and outages of the power distribution system generated from the acquired information by predetermined processing in a centralized manner; and
   a network that connects the transmission monitoring server, the distribution monitoring server, the calculation server, and a terminal that controls transmission facilities and distribution facilities in the areas, wherein
   the transmission monitoring control server, the distribution monitoring control server, and the calculation server are consolidated and provided as a server base, and
   the transmission monitoring control subsystems and the distribution monitoring control subsystems each perform monitoring control of the power transmission system and the power distribution system in the areas on the basis of the outage plan name that is managed by the calculation server in a centralized manner.

2. The monitoring control system according to claim 1, wherein
   the transmission monitoring control subsystems and the distribution monitoring control subsystems each include an outage plan name registration unit that transmits the outage plan name to the calculation server, and
   the outage plan name registration unit converts the outage plan name into a common data format usable in each of the transmission monitoring control subsystems and the distribution monitoring control subsystems.

3. The monitoring control system according to claim 1, wherein
   the transmission monitoring control subsystems and the distribution monitoring control subsystems each include an operation unit that creates an operation procedure on the basis of the outage plan name, and
   the operation unit of either one of the transmission monitoring control subsystems and the distribution monitoring control subsystems creates the operation procedure on the basis of a system state that the other subsystems execute the operation procedure.

4. The monitoring control system according to claim 3, wherein
   the operation unit includes an operation name management unit that receives a switchability determination request on whether or not an outage plan is executable, and
   the operation name management unit creates a scheduled system on the basis of the outage plan name and transmits a switchability determination response on the basis of the scheduled system.

5. The monitoring control system according to claim 3, wherein the operation unit includes a simulation execution unit that checks the created operation procedure by using a simulated system.

6. The monitoring control system according to claim 3, wherein the operation unit includes an actual execution unit that performs an actual execution according to the operation procedure.

7. The monitoring control system according to claim 6, wherein the actual execution unit stops the actual execution according to a predetermined standard.

8. The monitoring control system according to claim 3, wherein the operation unit executes a simulation execution of the operation procedure with the simulation execution unit before performing the actual execution.

9. The monitoring control system according to claim 3, wherein the operation unit creates, on the basis of the outage plan names, the operation procedure in which the operation procedures corresponding to the outage plan names are consolidated into a series of operations.

10. The monitoring control system according to claim 1, wherein
   the server base includes a plurality of server bases, and the server bases are synchronized with each other.

11. The monitoring control system according to claim 1, wherein the network is multiplexed.

12. The monitoring control system according to claim 2, wherein the transmission monitoring control server, the distribution monitoring control server, and the calculation server are each multiplexed at the one server base.

* * * * *